United States Patent
Yip et al.

(10) Patent No.: US 7,657,635 B2
(45) Date of Patent: Feb. 2, 2010

(54) METHOD AND APPARATUS FOR CONVERTING NETWORK MANAGEMENT PROTOCOL TO MARKUP LANGUAGE

(75) Inventors: Michael Yip, Sunnyvale, CA (US); Yeeping Chen Zhong, Milpitas, CA (US); Qi Cao, Diamond Bar, CA (US); Abhay Gidwani, Sunnyvale, CA (US)

(73) Assignee: Extreme Networks, Santa Clara, CA (US)

( * ) Notice: Subject to any disclaimer, the term of this patent is extended or adjusted under 35 U.S.C. 154(b) by 899 days.

(21) Appl. No.: 10/902,963

(22) Filed: Jul. 30, 2004

(65) Prior Publication Data

US 2006/0036723 A1 Feb. 16, 2006

(51) Int. Cl.
*G06F 15/16* (2006.01)
(52) U.S. Cl. .................. 709/228; 709/202; 709/227
(58) Field of Classification Search ................ 709/222, 709/223, 228, 230, 229; 717/136
See application file for complete search history.

(56) References Cited

U.S. PATENT DOCUMENTS

| | | | | |
|---|---|---|---|---|
| 5,367,635 | A * | 11/1994 | Bauer et al. ................. | 709/221 |
| 6,003,077 | A * | 12/1999 | Bawden et al. .............. | 709/223 |
| 6,253,226 | B1 * | 6/2001 | Chidambaran et al. ...... | 718/104 |
| 6,842,786 | B1 * | 1/2005 | Webb .......................... | 709/230 |
| 6,847,614 | B2 * | 1/2005 | Banker et al. ............... | 370/252 |
| 7,017,082 | B1 * | 3/2006 | Yip et al. ..................... | 714/38 |
| 7,099,947 | B1 * | 8/2006 | Nadeau et al. .............. | 709/229 |
| 7,200,548 | B2 * | 4/2007 | Courtney ..................... | 703/27 |
| 7,245,619 | B1 * | 7/2007 | Guan et al. .................. | 370/392 |
| 7,290,263 | B1 * | 10/2007 | Yip et al. .................... | 719/313 |
| 7,302,486 | B1 * | 11/2007 | Pai et al. ..................... | 709/228 |
| 7,461,158 | B2 * | 12/2008 | Rider et al. .................. | 709/229 |
| 2002/0032769 | A1 * | 3/2002 | Barkai et al. ................ | 709/224 |
| 2002/0116645 | A1 * | 8/2002 | Cloutier et al. ............. | 713/201 |
| 2003/0069956 | A1 * | 4/2003 | Gieseke et al. .............. | 709/223 |
| 2003/0177477 | A1 * | 9/2003 | Fuchs .......................... | 717/136 |
| 2003/0204578 | A1 * | 10/2003 | Yip et al. .................... | 709/222 |

(Continued)

FOREIGN PATENT DOCUMENTS

EP 1376932 A2 2/2004

OTHER PUBLICATIONS

Andrey Soares et al: "Specification of a MIB XML for Systems Management" Local Computer Networks, Nov. 6, 2002. pp. 241-248, XP010628173.
Shinichi Matsumoto et al: "Network Management with Intelligent Trader" Computer Software and Applications Conference, Oct. 25, 2000. pp. 161-163, XP010523761.

(Continued)

*Primary Examiner*—Ario Etienne
*Assistant Examiner*—Tae K Kim
(74) *Attorney, Agent, or Firm*—Blakely Sokoloff Taylor & Zafman (57) ABSTRACT

A method is provided to convert network management protocol request into a markup language representation. In one embodiment, the present invention includes receiving a network management protocol request at a network device, generating a plurality of markup language tags and content embedded in the markup language tags based on the received request, and responding to the request using the plurality of markup language tags and content embedded in the markup language tags using a unified backend interface. In one embodiment, routines used to generate the plurality of markup language tags and content are generated automatically using an instrumentation module.

22 Claims, 4 Drawing Sheets

U.S. PATENT DOCUMENTS

2005/0138609 A1*  6/2005  Mitchell .................... 717/136
2006/0023724 A1*  2/2006  Na et al. ................ 370/395.53
2006/0036723 A1*  2/2006  Yip et al. .................... 709/223

OTHER PUBLICATIONS

"Method and Apparatus for Dynamic Configuration Management", U.S. Appl. No. 10/132,946, filed Apr. 26, 2002, Whole Document.

* cited by examiner

METHOD AND APPARATUS FOR CONVERTING NETWORK MANAGEMENT PROTOCOL TO MARKUP LANGUAGE

TECHNICAL FIELD

The present invention relates to the field of network management. In particular, the present invention relates to managing a network device using a network management protocol.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2004, Extreme Networks, Inc., All Rights Reserved.

BACKGROUND AND RELATED ART

The architecture of high-performance Internet routers has advanced in the last several years to provide increased performance in routing ever-greater volumes of network traffic. It is not uncommon for a router to support numerous protocols as well as several control applications for configuration and maintenance of the router tables, protocols, and network policies. These advances have increased the complexity of the router such that the efficient management of the router's configuration is critical for reliable network performance.

The configuration of a router is typically managed by a centralized system configuration database residing on the router. The contents of the configuration database control the operation of the router, and manipulation of the contents of the configuration database are accomplished using a management interface, such as a command line interface (CLI). In a traditional router architecture, the CLI has full access to the system configuration database through a configuration manager process, and is intended to be the primary method of access for system professionals. The CLI can be used not only for configuration commands, but also for other interactive commands that control the operation of the router, e.g. commands to start up or shut down specific applications or processes.

Another commonly used management interface to the configuration of the router is the Simple Network Management Protocol (SNMP). SNMP is a protocol that governs network management and monitoring of network devices and their functions and is documented in Request For Comment (RFC) 2570, *Introduction to Version 3 of the Internet-Standard Network Management Framework*, authored by the Network Working Group of the Internet Engineering Task Force (ETF), and published by the Internet Society in April, 1999. Yet another more recently developed management interface to the configuration database of the router is based on the Extensible Markup Language, or XML. An XML-based network management interface typically uses XML to encode communication data that was entered by a network administrator via a graphical user interface (GUI), and provides a mechanism for transmitting the complex data that is used to manage networking devices to the configuration database.

It is not uncommon for certain applications and protocols on a router to allow access to their corresponding configuration data by all three of the above-described network management interfaces—CLI, SNMP, and XML. In fact, a network administrator could enter different CLI or SNMP commands that accomplish the identical configuration change on a given router. Maintaining the router to recognize all of the different management interface commands for all of the various applications and protocols that the router supports can be difficult, requiring numerous updates to data such as SNMP management information base (MIB) definitions, CLI command trees, or XML tags. Furthermore, separate backend processes must be maintained for all management applications and protocols, further complicating the router.

SUMMARY

A method is provided to convert network management protocol request into a markup language representation. In one embodiment, the present invention includes receiving a network management protocol request at a network device, generating a plurality of markup language tags and content embedded in the markup language tags based on the received request, and responding to the request using the plurality of markup language tags and content embedded in the markup language tags using a unified backend interface. In one embodiment, routines used to generate the plurality of markup language tags and content are generated automatically using an instrumentation module.

DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for dynamic configuration management will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, packets, messages, tables, command, message information base, command trees, tags and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

It should be noted that while the description that follows addresses the method and apparatus as it applies to a network device such as a router, or layer 3 switch, it is appreciated by those of ordinary skill in the art that method is generally applicable to any packet forwarding device, including a bridge (layer 2 switch), server or gateway. It should also be noted that while the method and apparatus may be discussed in the context of a local area network (LAN), the present invention may also be used in the context of other Transport Control Protocol/Internet Protocol (TCP/IP)-based networks including, but not limited to, internetworks, Virtual Local Area Networks (VLANs), Metropolitan Area Networks (MANs), and Wide Area Networks (WANs), as well as networks organized into subnets.

Figure 1:
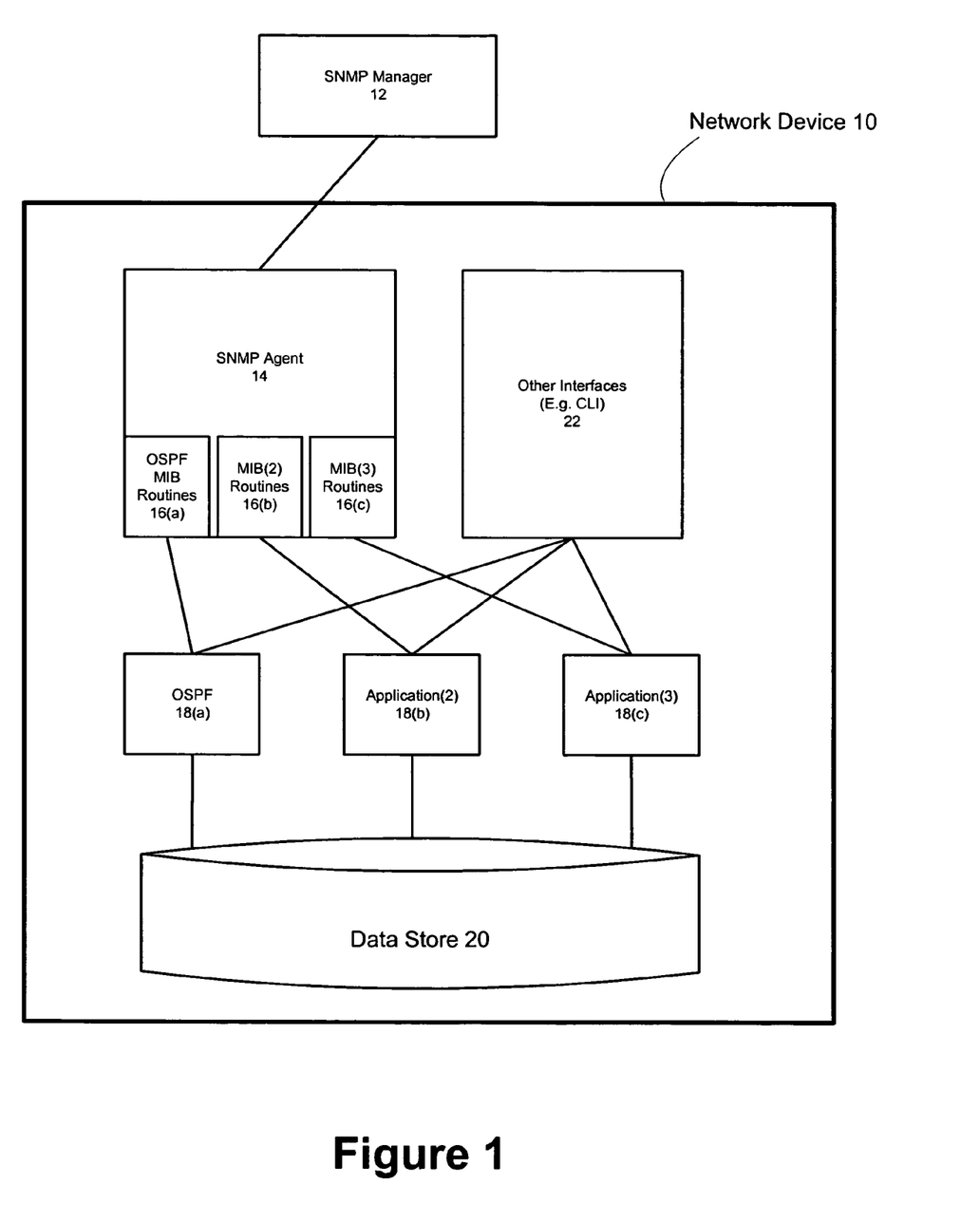
FIG. 1 is a block diagram illustrating a network device.

FIG. 1 is a block diagram illustrating a network device 10 configured to be managed using multiple interfaces. One management protocol used is SNMP. An SNMP request originates with an SNMP manager 12 at some remote machine, and is received by an SNMP agent 14 residing on the network device 10. The SNMP agent 14 unpacks the payload of the SNMP request.

The SNMP agent 14 contains one or more sets of management information base (MIB) routines 16. The MIB routines 16 are computer code—also referred to as instrumentation code—written by a developer to process the SNMP request payloads. Generally a set of MIB routines contains three routines, one for each possible SNMP request (Get, Set, and GetNext). Other network management protocols may have a different number of requests and MIB routines. For example, the Open Shortest Path First (OSPF) MIB routines 16(a) process SNMP request payload directed at OSPF configuration data.

The MIB routines 16 are instrumented to call on backend applications 18 to retrieve or set the appropriate management objects. For example, if the received SNMP request was a Get request for a specific MIB object's value', the OSPF_Get routine in the SNMP agent 14 would call the OSPF application 18(a) to retrieve the value from a data store 20, such as a configuration database.

The network device 10 can be managed using other interfaces 22—such as CLI—as well. For each additional interface, separate backend application calls and handlers must be written. That is, separate backend processing paths must be established for each interface and each application because each interface uses different data and command formats.

Figure 2:
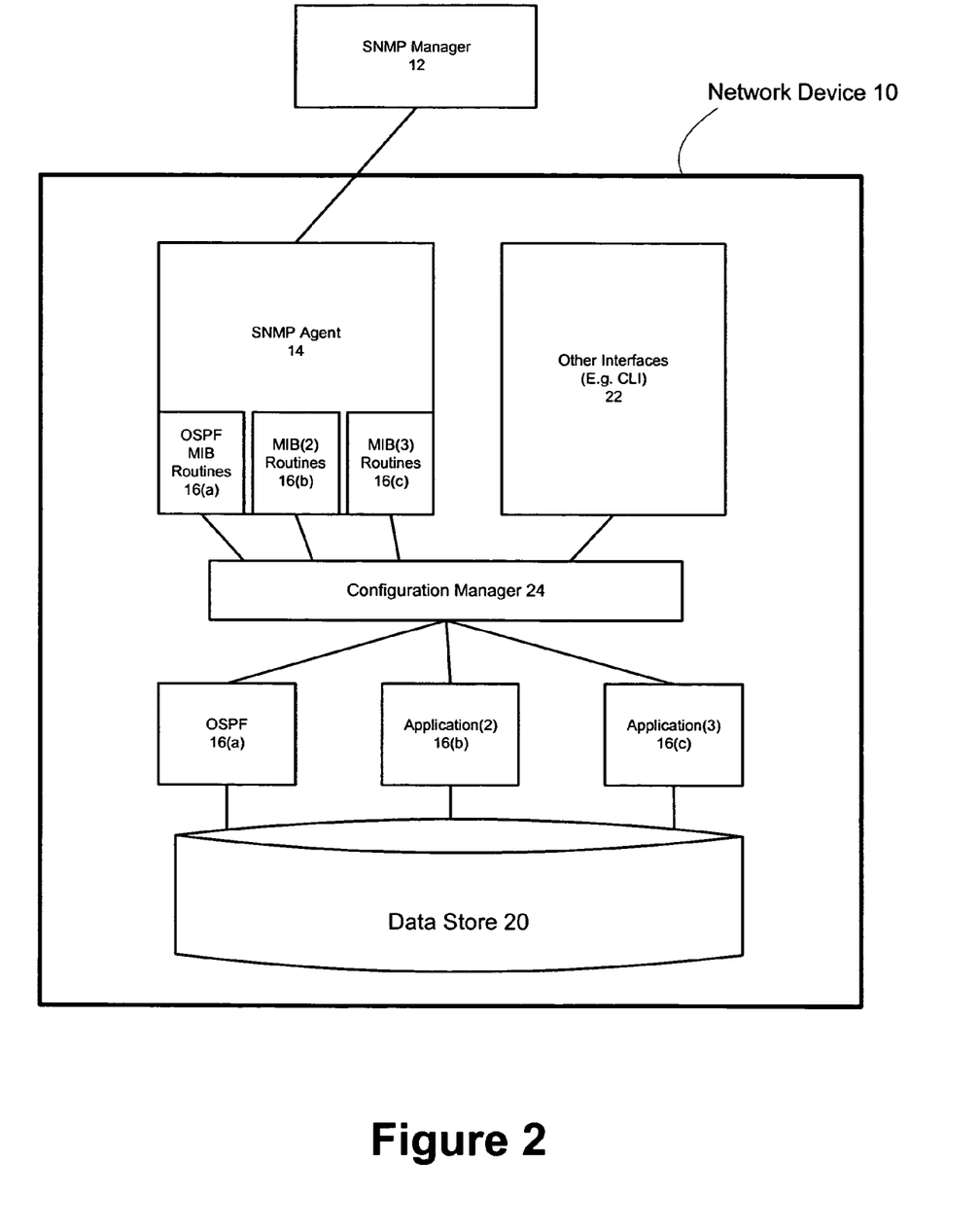
FIG. 2 is a block diagram illustrating a network device configured in accordance with one embodiment of the present invention.

A network device 10 having a centralized backend according to one embodiment of the present invention is shown in FIG. 2. In one embodiment, the network device 10 includes a configuration manager 24 that interfaces with backend management processing using a markup language protocol. In one embodiment, the markup language is XML. Several implementations of a network device 10 having a centralized configuration manager 24 are further described in U.S. patent application Ser. No. 10/132,946 entitled "Method and Apparatus for Dynamic Configuration Management," filed Apr. 26, 2002, which is hereby fully incorporated by reference.

In such an embodiment, the SNMP agent 14 must convert SNMP request into XML tags and content that can be processed by the configuration manager 24. Thus, in one embodiment, the MIB routines 16 are designed to convert the request payload into XML tags, and to embed the appropriate payload content into the XML tags. The XML tags and content is then provided to the configuration manager 24 that parses the XML tags and performs the backend processing. In one embodiment, the MIB routines reside in a shared library, and can be dynamically loaded into the SNMP agent 14 when an application needing an SNMP interface is started.

Figure 3:
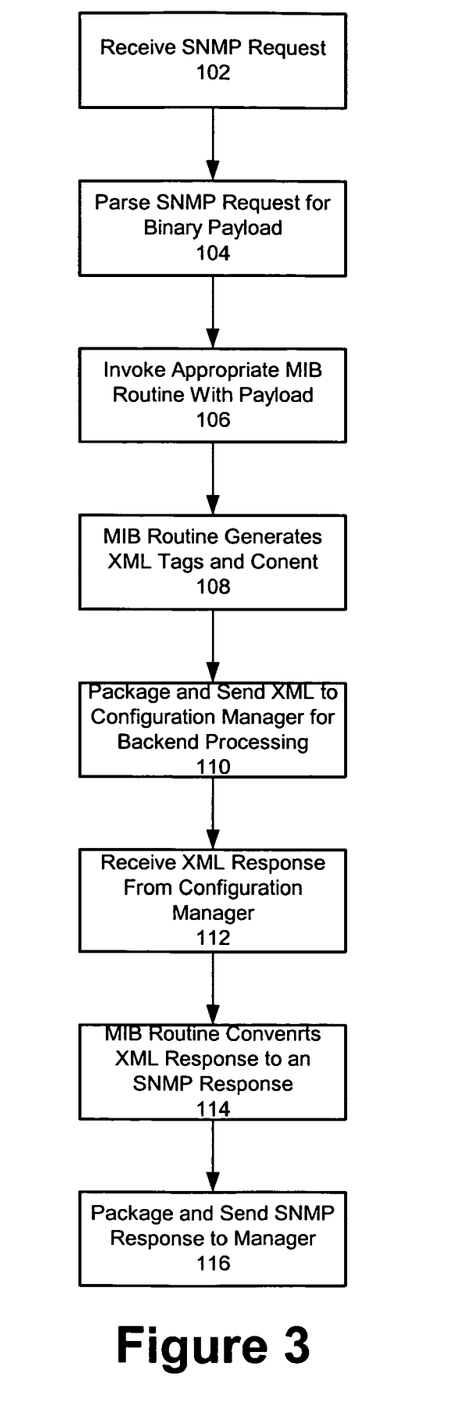
FIG. 3 is an flow diagram of SNMP request processing in accordance with one embodiment of the present invention.

One embodiment of runtime SNMP request processing is now illustrated with reference to the flow diagram shown in FIG. 3. In block 102, an SNMP request is received. SNMP requests generally take the form of a protocol datagram unit (PDU). The requests are either Get (e.g., retrieve a configuration value), Set (e.g., give a value to a configuration object), or GetNext (e.g., retrieve the next value from a table object). Other management protocols can make other requests as well.

In block 104, the SNMP request PDU is parsed to extract the binary payload, which indicates the type of the request and the values or objects of interest. Based on the request type, the appropriate MIB routine (e.g., ospf_set) is invoked in block 106, and the payload is passed as input to the routine. In block 108, the MIB routine converts the binary payload into XML tags and content that can be embedded in the XML tags. In block 110, the XML is packaged for transmission, and sent to the configuration manager. The configuration manager is configured to parse the XML tags and perform the backend processing tasks associated with the request.

When the backend processing is complete—that is the appropriate value or values have been retrieved or set—in block 112 an XML response is received from the configuration manager. For example, the XML response may contain the value of interest embedded in XML tags, or an XML representation of the set confirmation. In block 114, the MIB routine processes the XML response by converting it into SNMP format. For example, the MIB routine may map the content embedded in a particular XML tag pair back into an SNMP variable representing a manageable object. The request processing completes in block 116 when the SNMP response is sent to the manager that initiated the request.

Figure 4:
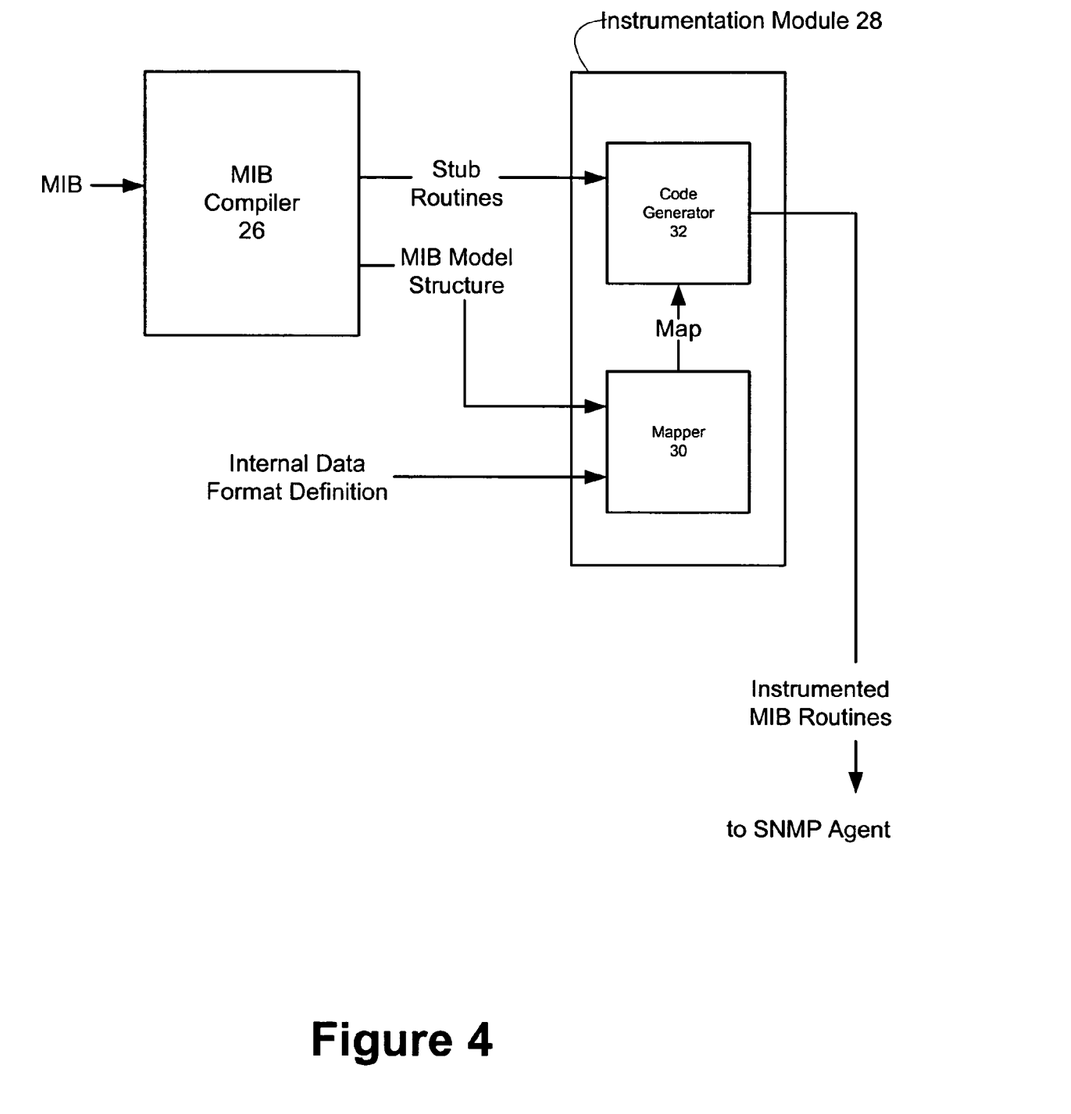
FIG. 4 is a block diagram illustrating an instrumentation module in accordance with one embodiment of the present invention.

In one embodiment, the MIB routines 16 of the SNMP agent 14 are generated automatically by the network device. FIG. 4 provides a conceptual block diagram of automatic instrumentation code generation. In one embodiment, when instrumentation code for a new or updated MIB is to be generated the MIB is provided to an MIB compiler 26. In one embodiment, an MIB is a text file that contains the management and configuration information for the network device. The MIB enables the SNMP manager 12 to make requests from the network device 10.

The MIB and the MIB compiler 26 are generally provided by the SNMP vendor. In one embodiment, the MIB compiler 26 uses the MIB to generate a stub routine for each SNMP request, i.e. Get, Set, GetNext. The stub routines contain some generic code, but need to be filled with instrumentation code that performs the specific request.

In one embodiment, the MIB compiler 26 also generates a MIB model structure. The MIB model structure defines the data format of the MIB. In one embodiment, the MIB model structure is implemented as a data structure in a high-level programming language. In one embodiment, the MIB model is a "C struct" structure that contains the object names and data types contained in the MIB.

In one embodiment, the network device 10 also contains an instrumentation module 28 configured to automatically generate the instrumentation code needed to complete the stub routines. In one embodiment, the instrumentation module 28 also takes as input a data structure modeling the internal data store. In FIG. 4 this data structure is referred to as the internal data format definition. In one embodiment, this structure is similar to the MIB model, in that it provides the names and data types of the values as represented in the internal configuration database.

For example, one managed object in the OSPF protocol is the ospfAreaId. In the MIB, this value is represented as an unsigned integer of 32 bytes. However, in an example network device 10, the ospfAreaID may be provided as an ip_address (Internet Protocol Address) data type. In other examples, the names of identical values may be different as well.

In one embodiment, the instrumentation module 28 includes a mapper 30 that establishes a mapping between the MIB model structure and the internal data format. In one embodiment, the mapping is defined by the position of the objects within the structures, i.e., the first object of the MIB model is mapped to the first object of the internal data format structure, the second object of the MIB model is mapped to the second object of the internal data format structure, and so on. Other mapping definitions are also possible.

In one embodiment, the instrumentation module 28 also includes a code generator 32 that takes the map defined by the mapper 30 and the stub routines generated by the MIB compiler 26 as input. In one embodiment, the code generator is implemented as a script. The code generator parses the mapping to create generic code depending on the specific routine, and inserts XML tags into the code as directed by the mapping, such that the resultant instrumentation code, when executed, will convent SNMP payload data into the provided XML tags and embedded content.

Since the actions performed by the MIB routines 16 are relatively standard, the major function of the code generator is the insertion of the appropriate XML tags, which can be derived directly from the mapping. In one embodiment, the internal data format definition structure (or file) is generated by an engineer at compile time. However, the internal data format authoring does not add to development time, because such a structure must be generally developed anyway to support the other interfaces 22, such as CLI.

When the code generator 32 is finished generating the instrumentation code, the code is inserted into the stub routines thus completing the instrumentation stage. The fully instrumented MIB routines 16 are then provided to the SNMP agent 14, which uses them for SNMP to XML conversion at runtime.

An example is now provided of the automatic instrumentation of a MIB routine to further clarify the invention. This example is specific to one object of the OSPF protocol and one specific MIB routine. It is provided here only as an example to further demonstrate the invention. This example shows the generation of instrumentation code for a Get MIB routine for the ospfAreaTable object contained in the OSPF-MIB in RFC 1850. In this example, the MIB model structure generated by the MIB compiler 26 would be:

```
typedef struct __ospfAreaEntry_t {
    UINT32      ospfAreaId;
    INT32       ospfAuthType;
    INT32       ospfImportAsExtern;
    UINT32      ospfSpfRuns;
    UINT32      ospfAreaBdrRtrCount;
    UINT32      ospfAsBdrRtrCount;
    UINT32      ospfAreaLsaCount;
    INT32       ospfAreaLsaCksumSum;
    INT32       ospfAreaSummary;
    INT32       ospfAreaStatus;
    char        valid[2];
} ospfAreaEntry_t;
```

For the case of an example switch, the internal data formal definition may be established at compile time as:

```
struct ospfArea_t {
    ipv4n       ospfAreaId;
    uint32      ospfAuthType;
    uint32      ospfImportAsExtern;
    uint32      ospfSpfRuns;
    uint32      ospfAreaBdrRtrCount;
    uint32      ospfAsBdrRtrCount;
    uint32      ospfAreaLsaCount;
    uint32      ospfAreaLsaCksumSum;
    uint32      ospfAreaSummary;
    uint32      ospfAreaStatus;
} ospfArea;
```

In this example, the mapper 30 would establish the map between these structures based on the position of the variables. For example, INT32 ospfAuthType would be mapped to uint32 ospfAuthType. Based on this map, the code generator would insert instrumentation code (bold) into the stub routines (plain text) as follows:

```
ospfAreaEntry_t *
k_ospfAreaEntry_get(int serialNum, ContextInfo *contextInfo,
        int nominator,
        int searchType,
        SR_UINT32 ospfAreaId)
{
    static ospfAreaEntry_t ospfAreaEntryData;
    char *xmlReply = NULL;
    char *backendModule = "ospf";
    char *xmlGetString =
"<module_%s><get><ospfArea><ospfAreaId>%s</ospfAreaId></ospfArea></get>
</module_%s>";
    ospfArea_t *ospfArea = NULL;
    if (ospfAreaEntrySendXmlToCfgMgr_get(backendModule,
        xmlGetString,
searchType, ospfAreaId)) {
        return NULL;
    }
    xmlReply = gCmFrontendSnmp->request.configuration;
    ospfArea = (ospfArea_t *)cmGetObject(gObjectParser,
        backendModule,
xmlReply, strlen(xmlReply));
    if (!ospfArea) {
        free(xmlReply);
        xmlReply = NULL;
        return NULL;
    }
    ospfAreaEntryData.ospfAreaId =
ntohl(ospfArea->ospfAreaId);
    ospfAreaEntryData.ospfAuthType =
```

```
        ospfArea->ospfAuthType;
        ospfAreaEntryData.ospfImportAsExtern =
        ospfArea->ospfImportAsExtern;
        ospfAreaEntryData.ospfSpfRuns =
        ospfArea->ospfSpfRuns;
        ospfAreaEntryData.ospfAreaBdrRtrCount =
        ospfArea->ospfAreaBdrRtrCount;
        ospfAreaEntryData.ospfAsBdrRtrCount =
        ospfArea->ospfAsBdrRtrCount;
        ospfAreaEntryData.ospfAreaLsaCount =
        ospfArea->ospfAreaLsaCount;
        ospfAreaEntryData.ospfAreaLsaCksumSum =
        ospfArea->ospfAreaLsaCksumSum;
        ospfAreaEntryData.ospfAreaSummary =
        ospfArea->ospfAreaSummary;
        {
            int actionMap[ ] = ACTION_TO_ROWSTATUS_MAP;
            ospfAreaEntryData.ospfAreaStatus =
            actionMap[ospfArea->action];
        }
    if (xmlReply) {
        free(xmlReply);
        xmlReply = NULL;
    }
    if (ospfArea)
        ospfArea_t_free(ospfArea);
    if (nominator == -1) { // We were called by the_test( ) func
        SNMP_SET_VALID(I_ospfAreaId, ospfAreaEntryData.valid);
    } else {
        SNMP_SET_ALL_VALID(ospfAreaEntryData.valid);
    }
    return(&ospfAreaEntryData);
}
```

In the example above, the routine ospfAreaEntrySendXmlToCfgMgr_get is also auto-generated. It's content is omitted in this example for brevity. One skilled in the art will appreciate from the example above how a script can be configured to parse the mapping shown above to generate the XML tags in the instrumentation code above.

Accordingly, a novel method and apparatus is described in which a network device 10 converts SNMP requests into XML for the purposes of backend request processing. From the foregoing description, those skilled in the art will recognize that many other variations of the present invention are possible. In particular, while the present invention has been described as being implemented in a network device using an SNMP agent 14 and a configuration manager 24, it should be noted that some of the logic described herein may be distributed in other components of a network device without departing from the scope of the present invention.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data.

Furthermore, some embodiments of the present invention have been described as relating to SNMP and XML in particular. Other specific programming languages, such as C and C++ are also mentioned. However, the present invention is not limited to these specific protocols, markup languages, and programming languages. Other network management protocols (e.g., Common Management Information Protocol (CMIP)), markup languages (e.g., Extensible HyperText Markup Language (XHTML)), and programming language structures (e.g., Pascal) may be used. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A method performed by a network device including a data store modeled by an internal data format definition, the method comprising:
at an instrumentation module of a network device,
receiving a stub routine from a compiler, the stub routine corresponding to a network management protocol request,
accessing a mapping of the internal data format definition to a management information base (MIB) model structure of the compiler, wherein objects of the MIB model structure are mapped with respective objects of the internal data format definition, and
automatically generating an MIB routine from the stub routine, including inserting into the stub routine instrumentation code based on the mapping of the internal data format definition with the MIB model structure;
providing the generated MIB routine to a network management protocol agent of the network device;
receiving at the network device a network management protocol request; and
in response to the receiving the network management protocol request, the network management protocol agent processing the network management protocol request, including
parsing the network management protocol request to extract a binary payload,
based on the extracted binary payload, executing the generated MIB routine, and
with the executing MIB routine, converting the extracted binary payload into a plurality of markup language tags and content embedded in the markup language tags, and
sending the plurality of markup language tags and content embedded in the markup language tags to an application of the network device in a request to access a management object of the data store.

2. The method of claim 1, further comprising retrieving a value from a data store in response to the sent plurality of markup language tags and content embedded in the markup language tags.

3. The method of claim 2, further comprising embedding the retrieved value in markup language tags, re-packaging the retrieved value in network management protocol format, and providing the retrieved value to a requesting entity.

4. The method of claim 1, wherein the management protocol request comprises a simple network management protocol (SNMP) request.

5. The method of claim 1, wherein the plurality of markup language tags comprise a plurality of extensible markup language (XML) tags.

6. A method comprising:
compiling for a network device a simple network management protocol (SNMP) management information base (MIB) modeled by an MIB model structure, the compiling to generate a plurality of stub routines, each stub routine corresponding to a network management protocol request, the network device including a data store modeled by an internal data format definition;

accessing a mapping of the internal data format definition to the MIB model structure, wherein objects of the MIB model structure are mapped with respective objects of the internal data format definition;

automatically generating an MIB routine from the plurality of stub routines, including inserting into a stub routine instrumentation code based on the mapping of the internal data format definition with the MIB model structure;

providing the generated MIB routine to a network management protocol agent of the network device; and at the network management protocol agent,
- passing a payload of a network management protocol request as input to the MIB routine,
- executing the MIB routine according to the passed input, the executing to convert the payload of the network management protocol request into a plurality of markup language tags and content embedded in the markup language tags, and
- sending the plurality of markup language tags and content embedded in the markup language tags to an application of the network device in a request to access a management object of the data store.

7. The method of claim 6, wherein compiling the MIB further generates the MIB model structure.

8. The method of claim 6, wherein the plurality of stub routines comprise a Get, a Set, and a GetNext stub routine.

9. The method of claim 7, wherein the MIB model structure comprises a C struct.

10. A network device comprising:
a data store modeled by an internal data format definition;
an instrumentation module to receive a stub routine, the stub routine corresponding to a network management protocol request, the instrumentation module further to access a mapping of the internal data format definition to a management information base (MIB) model structure, wherein objects of the MIB model structure are mapped with respective objects of the internal data format definition, the instrumentation module further to automatically generate an MIB routine from the stub routine, including inserting into the stub routine instrumentation code based on the mapping of the internal data format definition to the MIB model structure;
a network interface to receive a simple network management protocol (SNMP) request from a manager;
an SNMP agent to receive the generated MIB routine from the instrumentation module, the SNMP agent further to translate the SNMP request, including
- parsing the SNMP request to extract a binary payload,
- based on the extracted binary payload, executing the generated MIB routine, and
- with the executing MIB routine, converting the extracted binary payload into a plurality of markup language tags and content embedded in the markup language tags; and
a configuration manager to perform backend processing of the translated SNMP request to access MIB information in the data store, including parsing the plurality of markup language tags.

11. The network device of claim 10, wherein the SNMP agent comprises at least one set of SNMP management information base (MIB) routines, each MIB routine corresponding with an SNMP request.

12. The network device of claim 10, wherein the network device comprises one of a switch and a router.

13. The network device of claim 10, further comprising:
an MIB compiler to generate a plurality of stub routines including the stub routing received by the instrumentation module.

14. The network device of claim 13, wherein the MIB compiler also generates the MIB model structure.

15. The network device of claim 14, wherein the instrumentation module comprises a mapper to define the mapping between the MIB model structure and the internal data format definition.

16. The network device of claim 13, wherein the instrumentation module comprises script code configured to populate the stub routines with extensible markup language (XML) tags.

17. The network device of claim 13, wherein the network device comprises one of a switch and a router.

18. A machine-readable medium having stored thereon data representing instructions that, when executed by a processor of a network device, cause the processor to perform operations comprising:

compiling for a network device a simple network management protocol (SNMP) management information base (MIB) modeled by an MIB model structure, the compiling to generate a plurality of stub routines, each stub routine corresponding to a network management protocol request, the network device including a data store modeled by an internal data format definition;

accessing a mapping of the internal data format definition to the MIB model structure, wherein objects of the MIB model structure are mapped with respective objects of the internal data format definition;

automatically generating an MIB routine from the plurality of stub routines, including inserting into a stub routine instrumentation code based on the mapping of the internal data format definition with the MIB model structure;

providing the generated MIB routine to a network management protocol agent of the network device; and at the network management protocol agent,
- passing a payload of a network management protocol request as input to the MIB routine,
- executing the MIB routine according to the passed input, the executing to convert the payload of the network management protocol request into a plurality of markup language tags and content embedded in the markup language tags, and
- sending the plurality of markup language tags and content embedded in the markup language tags to an application of the network device in a request to access a management object of the data store.

19. The machine-readable medium of claim 18, wherein compiling the MIB further generates the MIB model structure.

20. A machine-readable medium having stored thereon data representing instructions that, when executed by a processor of a network device, cause the processor to perform operations comprising:

at an instrumentation module of the network device,
- receiving a stub routine from a compiler, the stub routine corresponding to a network management protocol request, the network device including a data store modeled by an internal data format definition,
- accessing a mapping of the internal data format definition to a management information base (MIB) model structure of the compiler, wherein objects of the MIB model structure are mapped with respective objects of the internal data format definition, and automatically generating an MIB routine from the stub routine, including inserting into the stub routine instrumentation code based on the mapping of the internal data format definition with the MIB model structure;

providing the generated MIB routine to a network management protocol agent of the network device;

receiving at the network device a network management protocol request; and in response to the receiving the network management protocol request, the network management protocol agent processing the network management protocol request, including parsing the network management protocol request to extract a binary payload, based on the extracted binary payload, executing the generated MIB routine, and with the executing MIB routine, converting the extracted binary payload into a plurality of markup language tags and content embedded in the markup language tags, and sending the plurality of markup language tags and content embedded in the markup language tags to an application of the network device in a request to access a management object of the data store.

21. The machine-readable medium of claim 20, the operations further comprising retrieving a value from the data store in response to the sent plurality of markup language tags and content embedded in the markup language tags.

22. The machine-readable medium of claim 21, the operations further comprising embedding the retrieved value in markup language tags, re-packaging the retrieved value in network management protocol format, and providing the retrieved value to a requesting entity.

* * * * *

UNITED STATES PATENT AND TRADEMARK OFFICE
CERTIFICATE OF CORRECTION

PATENT NO.         : 7,657,635 B2                                    Page 1 of 1
APPLICATION NO. : 10/902963
DATED              : February 2, 2010
INVENTOR(S)        : Yip et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Twenty-eighth Day of December, 2010

David J. Kappos
*Director of the United States Patent and Trademark Office*